Feb. 1, 1927.  
J. KEISTER  
INTERNAL COMBUSTION ENGINE  
Filed May 12, 1924  
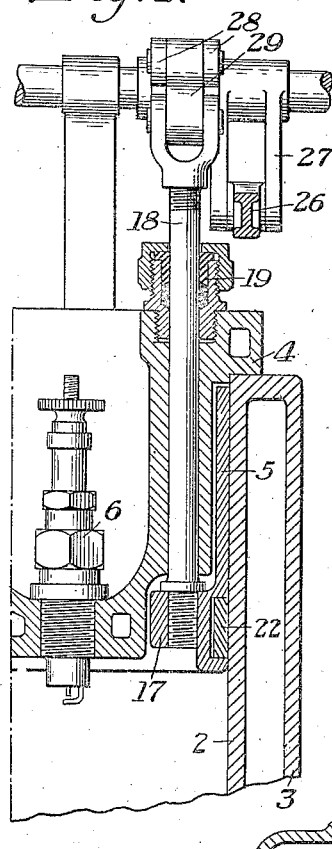
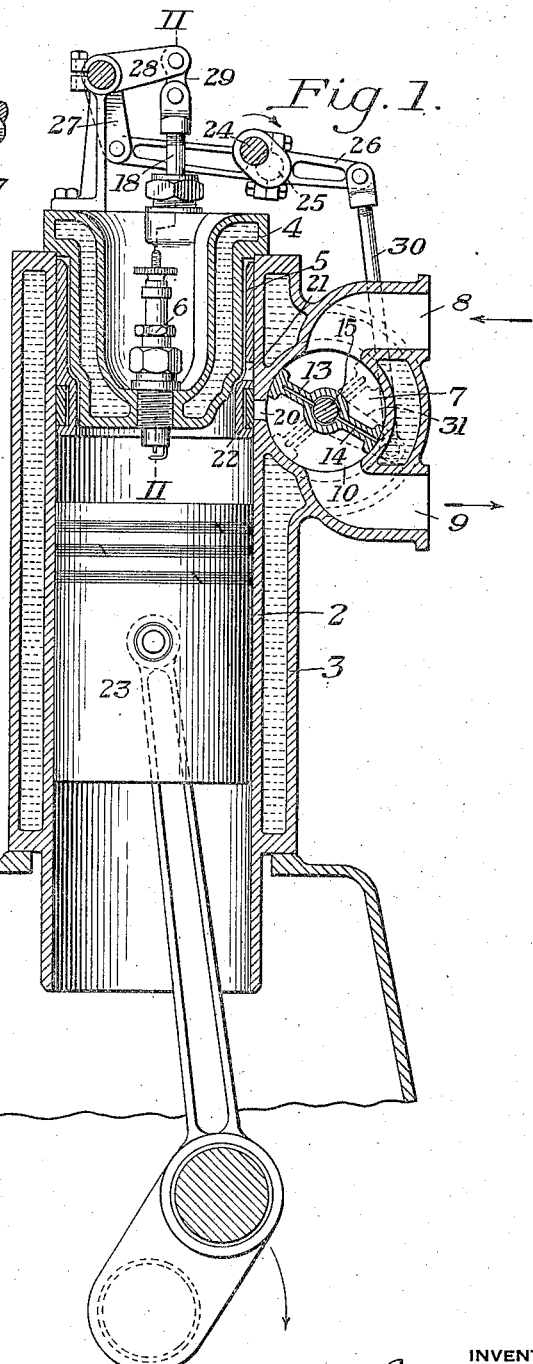

Feb. 1, 1927. 1,616,320
J. KEISTER
INTERNAL COMBUSTION ENGINE
Filed May 12, 1924  3 Sheets-Sheet 2

INVENTOR

Patented Feb. 1, 1927.

1,616,320

UNITED STATES PATENT OFFICE.

JAMES KEISTER, OF STEUBENVILLE, OHIO.

INTERNAL-COMBUSTION ENGINE.

Application filed May 12, 1924. Serial No. 712,509.

The present invention relates broadly to internal combustion engines, and more particularly to engines of the sleeve valve type.

Due to the quietness of operation, the ease of positive timing and the almost entire absence of any harmful carbon, where sleeve valves are used, the use of such valves with certain automotive engineers has met with considerable favor. Such valves, however, have been open to the objection that they are difficult to machine, this being particularly true where two valves are employed, one working inside of the other. During operation, valves of the sleeve type frequently become warped or distorted due to the pressure and temperature conditions under which they operate.

Where sleeve valves have been employed, it has been customary to drive the same from the main crank shaft by means of a secondary or eccentric crank shaft located adjacent thereto and driven therefrom, the secondary shaft having connecting rods extending upwardly to the sleeve valves. This operating mechanism has not enabled ideal timing, it being recognized that ordinarily such valves open a little too late in the cycle and close a little too early.

The present invention has for its objects to provide an improved valve of this general character, overcoming the objectionable difficulties referred to and capable of being operated in such manner as to insure proper valve timing. The actuating means for the valves is also so located as to render it easily accessible for repair or replacement as may be necessary.

In the accompanying drawings, there are shown for purposes of illustration only, certain preferred embodiments of the present invention, it being understood that the drawings do not define the limits of the invention, as changes in the construction and operation therein disclosed may be made without departing from the spirit of the invention or scope of my broader claims.

In the drawings—

Figure 1 is a vertical sectional view through a portion of one form of engine embodying certain features of the present invention;

Figure 2 is a vertical sectional view, on an enlarged scale, on the line II—II of Figure 1, the operating mechanism being illustrated largely in elevation;

Figure 3:
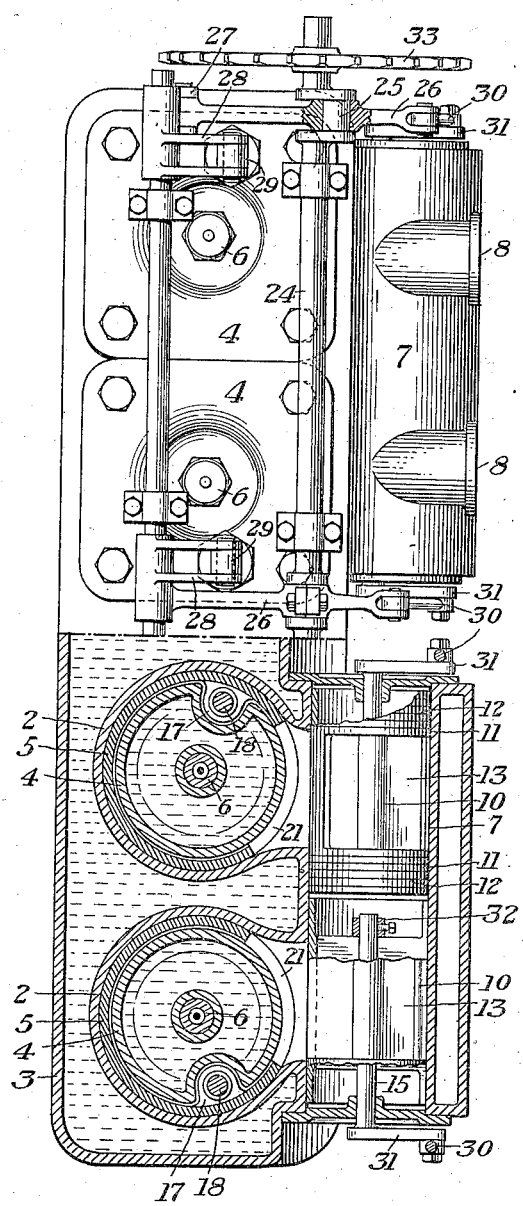
Figure 3 is a view, partly in top plan elevation and partly in section, of a four-cylinder engine embodying the features of construction shown in Figures 1 and 2.

In carrying out the present invention it is desirable to provide operating mechanism so located as to be readily accessible to permit repair or replacement with a minimum amount of labor, in the event such action is necessary. With sleeve valve motors as ordinarily constructed, the replacement of the wrist pins or connecting rods for the sleeves is an exceedingly difficult operation, the time required for exceeding the cost of the parts being replaced. This presents a practical objection to the use of motors of the sleeve valve type which it is one of the objects of the present invention to overcome.

In accordance with the present invention there may be provided a cylinder 2 of suitable construction preferably having a jacket 3 providing space for the usual cooling water. Cooperating with the cylinder is a reentrant head 4 having the portion projecting into the cylinder spaced from the walls thereof to provide an annular chamber for the reception of a sleeve valve 5. The head is preferably water cooled, as clearly shown in Figure 1 of the drawings, and carries a suitable igniting means 6.

The cylinders for a multi-cylinder engine may either be cast singly or en bloc, but in either event they will be shaped to provide an auxiliary valve chamber 7 exteriorly of the cylinder and provided with separate ports 8 and 9. In the illustrated embodiment of the invention the port 8 will serve as the intake while the port 9 will serve as the exhaust. Mounted in the chamber for cooperation with each cylinder is a spool valve 10 having heads 11 preferably each formed with oil grooves 12, the heads being connected by an intermediate relatively narrow portion 13. The valves 10 are preferably slotted as indicated at 14 throughout a substantial portion of their diameter to permit expansion and contraction of the valve so that it always tightly engages the walls of the chamber 7 without any binding or sticking such as ordinarily caused by expansion or contraction of the parts. These valves are also provided with a central longitudinally extending opening adapted to receive a shaft 15 by means of which they may oscillate in timed relation to the operation of the engine to perform the desired functions.

Figure 4:
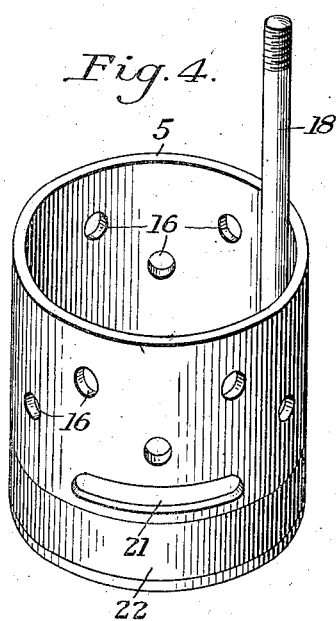
Figure 4 is a perspective view, on an enlarged scale, of the sleeve valve employed.

The annular or sleeve valves 5 are preferably constructed with a plurality of openings 16 extending through the walls thereof whereby the pressure conditions on opposite sides of the valve are balanced, as shown in Fig. 4, but which have been omitted from the sectional views such as Figs. 1 and 5, so as not to confuse these openings with the port 21, hereinafter described. This permits the use of an extremely light valve readily accommodating itself to the operating mechanism herein provided. Each sleeve is formed with a projection 17 for cooperation with an actuating rod 18 which is preferably threaded thereinto and projects upwardly therefrom adjacent the valve wall. As clearly indicated in Figure 2, the re-entrant head may be provided with a recess to receive the projection 17 and may be formed with a passage for the reception of the operating rod 18. A suitable packing 19 may be provided to prevent leakage around the operating rod.

The cylinder wall opposite the chamber 7 is provided with a single transversely elongated port 20 and the annular or sleeve valve for each cylinder is provided with a similarly shaped port 21, the sleeve valve preferably being provided with a packing means 22 for cooperation with the port 20 when the parts are in the sealing position indicated generally in Figure 1.

It will be understood that the oscillating valves 10 cooperate with the sleeve valves 5 to control the admission of a combustible mixture to, and the exhaust of burnt gases from, the engine. In Figure 1 of the drawings, the piston 23 is shown as just beginning its power stroke. At this time the port 20 is sealed by the packing means 22, thereby preventing leakage from the cylinder. At the conclusion of the power stroke it is desirable to uncover the port 20 to permit the piston on its upper stroke to expel burnt gases from the cylinder. This operation will be accomplished by the downward movement of the valve 5. On the next down stroke of the piston the sleeve valve will remain in its downward position with the port 21 in registration with the port 20, but the oscillating valve will occupy a position as indicated in dotted lines in this figure, permitting a combustible charge to be drawn through the port 8 into the cylinder. At the conclusion of the intake the sleeve valve will again be raised to the position shown in Figure 1 to close the port 20 and permit compression of the charge within the cylinder prior to the power stroke, as before described. For producing the desired movements of the valves in the proper relationship, there is provided an actuating mechanism located above and preferably carried by the engine. This mechanism comprises an actuating shaft 24 having an eccentric or throw 25 for each pair of valves. Cooperating with each of these throws is a rocking lever 26 having one end pivotally connected to the arm 27 of a suitable bell crank lever, the opposite arm 28 of which has a link connection 29 to the upper end of the operating rod 18. The opposite end of each of the rocking levers is pivotally connected to an operating rod 30 each of which is in turn pivotally connected to an arm 31 secured to a shaft 15. These shafts 15 may each be connected to their respective oscillating valves by driving dogs 32 preferably constructed to permit a slight relative movement between the driving shafts and the valves in an endwise direction.

The actuating shaft 24 may be provided at one end thereof with a suitable gear or sprocket 33 by means of which it may be driven from the crank shaft of the engine as well understood in the art, the operating connection being such that the shaft 24 will rotate in a clockwise direction as viewed in Figure 1. This rotation will be effective during substantially 90° of rotation from the position shown in Figure 1 for moving the lever 26 to the left to effect downward movement of the valve 5 so that at the conclusion of the power stroke the port 21 will be in registration with the port 20. During the next 90° of rotation of the actuating shaft it will be effective for raising the rocking lever 26 so that at the conclusion of the exhaust stroke the oscillating valve 10 will then move to a position along the dotted line as shown in Fig. 1 to prepare for the intake stroke. During the following 90° of rotation the rocking lever 26 will be moved to the right to gradually raise the sleeve valve 5 so that upon termination of the intake stroke the sleeve valve will be substantially in the position shown in Figure 1 preparatory to the compression stroke. During the last 90° of rotation of the actuating shaft, the oscillating valve will be returned to its original position preparatory to the next power stroke. It will be understood that during the time that either the oscillating valve or the sleeve valve of a given pair is being moved, the other valve of that pair will remain substantially stationary as at that time the eccentric 25 will be moving through what may be considered as a flat portion of its travel so far as imparting movement to such valve is concerned.

Figure 5:
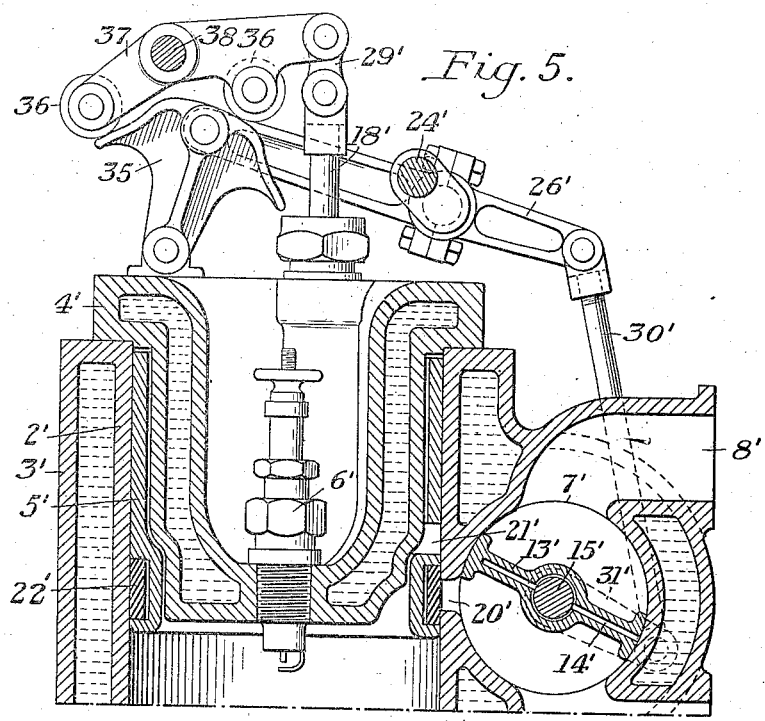
Figure 5 is a view similar to Figure 1, illustrating a slightly modified embodiment of the present invention.
Figure 6:
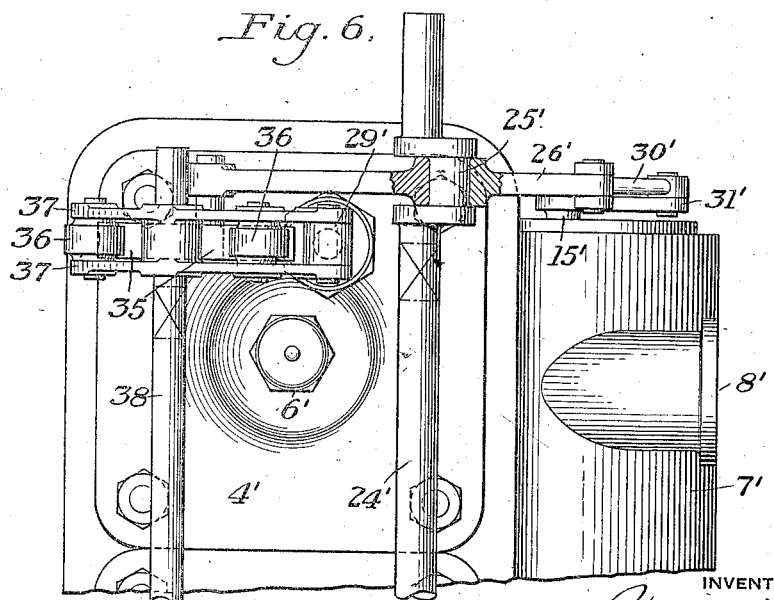
Figure 6 is a view similar to Figure 3, illustrating in top plan, the embodiment of the invention shown in Figure 5.

In Figures 5 and 6 of the drawings there is illustrated a slightly modified embodiment of the invention in which parts corresponding to the parts already described are indicated by the same reference characters, having a prime affixed thereto. In this form of the invention the rocking lever 26' for each pair of valves is connected at one end to a rocking cam 35 having its upper surface shaped to cooperate with rollers 36 carried by rocking lever 37 having a fixed pivotal mounting 38. This rocking lever takes the place of the bell crank heretofore described and has a link connection 29' at one end with the operating rod 18'. The operation of this form of engine will be exactly the same as that heretofore described, the rocking cam 35, however, being the direct operating means for the sleeve valve. By the use of an extremely light sleeve valve as heretofore described, it is made possible to use a cam for operating the same. The use of such a cam possesses many advantages, as it can be shaped to insure accurate valve timing.

The present application embodies certain of the features of construction shown in my copending application Serial No. 592,776, filed October 6, 1922, Patent No. 1,605,591, granted November 2, 1926, and of which the present application is a continuation.

The advantages of the present invention arise from the provision of an improved sleeve valve type motor having a single sleeve valve and operating mechanism located above the engine. Further advantages of the invention arise from the provision of a sleeve valve having a cam for actuating the same.

I claim:

1. In an internal combustion engine, a cylinder having a re-entrant head spaced from the cylinder wall through at least a portion of its length to provide a valve-receiving chamber in open communication with the combustion space of said cylinder, an annular reciprocating valve mounted in said chamber in sliding contact with the cylinder wall but spaced from said re-entrant head, said valve having a plurality of perforations spaced over its side walls and extending through said side walls to balance the pressure conditions on opposite sides thereof, said cylinder having a port adapted to be opened and closed by said valve, packing means for said valve covering said cylinder port in the closing position of said valve, and a piston below said head and valve.

2. In an internal combustion engine, a cylinder, a sleeve valve therein, an oscillating valve cooperating therewith, and an overhead eccentric for actuating both of said valves, substantially as described.

3. In an internal combustion engine, a cylinder, a sleeve valve therein, an oscillating valve, an eccentric and a floating lever connected to the eccentric for operating both of said valves, substantially as described.

4. In an internal combustion engine, a cylinder, a sleeve valve therein, said cylinder and valve having cooperating ports, a cooperating oscillating valve exteriorly of said cylinder, and means located above and carried by said engine for operating both of said valves, said means comprising a rotating eccentric, and a system of levers for imparting different relative movements to said valves respectively, substantially as described.

5. In an internal combustion engine, a cylinder, a sleeve valve and cooperating oscillating valve for each cylinder, an actuating shaft located above the cylinder, a rocking lever carried by said shaft, and means operatively connecting one end of said lever to the sleeve valve and the other end to the oscillating valve, substantially as described.

6. In an internal combustion engine, a cylinder, a sleeve valve and cooperating oscillating valve for each cylinder, an actuating shaft located above the cylinder, a rocking lever carried by said shaft, and means operatively connecting one end of said lever to the sleeve valve and the other end to the oscillating valve, the operating connection for the sleeve valve including an eccentric, substantially as described.

7. In an internal combustion engine, a cylinder, a sleeve valve and cooperating oscillating valve for each cylinder, an actuating shaft located above the cylinder, a rocking lever carried by said shaft, and means operatively connecting one end of said lever to the sleeve valve and the other end to the oscillating valve, substantially as described.

8. In an internal combustion engine, a cylinder having a port in the side-wall thereof, a piston reciprocating in said cylinder rearwardly of said port, a re-entrant head for said cylinder providing a concentric space between said head and the side wall of said cylinder in open communication with said cylinder, a cut-off sleeve valve for said cylinder port encompassing said head within said space and mounted for operating movement in engagement with the cylinder wall but out of contact with said head and said piston, said sleeve valve being provided with passage means balancing pressure conditions upon opposite faces thereof and packing means forming a gas-tight seal of said cylinder port during closure thereof, and complementary valve means exteriorly adjacent said cylinder port for controlling admission to and exhaust from said cylinder port.

9. In an internal combustion engine, a cylinder having a port in the side wall thereof, a working piston in said cylinder, a reentrant head projecting into said cylinder and forming with the side wall of the cylinder a concentric space in open communication with the combustion space of said cylinder, a cut-off sleeve valve for said cylinder port encompassing said head within said space and reciprocating in sliding engagement with said cylinder wall but out of contact with said head to open and close said cylinder port, said sleeve-valve having a plurality of spaced pressure-balancing passages extending through its wall connecting opposite faces thereof, an oscillating selector valve arranged exteriorly adjacent said cylinder port for controlling admission of the charge to and exhaust from said cylinder port, and driving means for said cut-off valve and said selector valve adapting said valves in cooperative relation to control the admission to and exhaust from said engine.

10. In an internal combustion engine, the combination with the cylinder and piston reciprocating therein, of a head for said cylinder having a portion projecting into said cylinder to provide with the adjacent side wall of said cylinder an annular valve chamber in open communication with the combustion space, said cylinder being provided with a port in its side wall opening interiorly into said valve chamber and exteriorly of the cylinder, a relatively short reciprocatory cut-off sleeve valve for said cylinder port of substantially the length of said projecting portion of said cylinder head mounted within said valve chamber in contact with the cylinder side wall but spaced from the projecting portion of the cylinder head, said sleeve valve being provided with passage means balancing pressure conditions upon opposite faces thereof and packing means forming a gas tight seal of said cylinder port during closure thereof by said valve, charge supply and exhaust passage means for said engine and selector valve means for opening and closing communication between said cylinder port and said charge supply and exhaust passage means, said selector valve means having a valve part movable across said cylinder port exteriorly of the cylinder.

In testimony whereof I have hereunto set my hand.

JAMES KEISTER.